US008024374B2

(12) United States Patent
Yorke (10) Patent No.: US 8,024,374 B2
(45) Date of Patent: Sep. 20, 2011

(54) COMPUTER OBJECT CONVERSION USING AN INTERMEDIATE OBJECT

(75) Inventor: Gordon Yorke, Fall River (CA)

(73) Assignee: Oracle International Corporation, Redwood Shores, CA (US)

( * ) Notice: Subject to any disclaimer, the term of this patent is extended or adjusted under 35 U.S.C. 154(b) by 285 days.

(21) Appl. No.: 12/508,876

(22) Filed: Jul. 24, 2009

(65) Prior Publication Data

US 2011/0022611 A1 Jan. 27, 2011

(51) Int. Cl.
*G06F 17/30* (2006.01)
(52) U.S. Cl. ........................................ 707/803; 707/812
(58) Field of Classification Search .................. 707/602, 707/792, 793, 802, 803, 809, 812; 713/167; 711/202
See application file for complete search history.

(56) References Cited

U.S. PATENT DOCUMENTS

| | | | | |
|---|---|---|---|---|
| 5,893,108 | A * | 4/1999 | Srinivasan et al. ................. | 1/1 |
| 6,065,011 | A * | 5/2000 | Bulusu et al. ..................... | 1/1 |
| 6,343,296 | B1 * | 1/2002 | Lakhamraju et al. .............. | 1/1 |
| 6,381,653 | B1 * | 4/2002 | Feray et al. ................... | 719/315 |
| 6,438,590 | B1 * | 8/2002 | Gartner et al. ................ | 709/219 |
| 7,020,659 | B2 | 3/2006 | Yorke | |
| 7,366,738 | B2 | 4/2008 | Yorke et al. | |
| 7,512,938 | B2 * | 3/2009 | Tarditi et al. .................. | 717/146 |
| 7,543,002 | B2 * | 6/2009 | Ghattu et al. ...................... | 1/1 |
| 7,555,495 | B2 | 6/2009 | Chu | |
| 7,555,506 | B2 | 6/2009 | Venkatesh et al. | |
| 7,624,383 | B2 * | 11/2009 | Barr et al. ..................... | 717/135 |
| 7,730,278 | B2 * | 6/2010 | Kessler ......................... | 711/170 |
| 7,774,746 | B2 * | 8/2010 | Mansfield et al. ............. | 717/106 |
| 7,844,612 | B2 * | 11/2010 | Colgrave et al. .............. | 707/754 |
| 2003/0014556 | A1 * | 1/2003 | Conway ......................... | 709/316 |
| 2004/0059814 | A1 * | 3/2004 | Komiya et al. ................ | 709/224 |
| 2004/0068733 | A1 * | 4/2004 | Longbardi ..................... | 719/316 |
| 2006/0036426 | A1 * | 2/2006 | Barr et al. ........................ | 703/22 |
| 2007/0220531 | A1 * | 9/2007 | Korn ............................. | 719/328 |
| 2007/0250824 | A1 * | 10/2007 | Souloglou et al. ............ | 717/146 |

OTHER PUBLICATIONS

Todd Greanier, Discover the secrets of the Java Serialization API, Jul. 2000, http://java.sun.com/developer/technicalArticles/Programming/serialization/.
Andrew Downs, Adding object persistence to Java applications, volume No. 14 (1998); Issue No. 4; column Tag: Java Workshop, http://mactech.com/articles/mactech/vol.14/14.04/javaserialization/index.html.
Oracle Technology Network, Oracle Fusion Middleware; Oracle Application Server 10g; Oracle TopLink, Frequently Asked Questions, Jan. 2006, http://www.oracle.com/technology/products/ias/toplink/technical/tl10g_faq.htm.
Oracle, Oracle Coherence 3.5;Data Sheet, http://www.oracle.com/products/middleware/coherence/docs/oracle-coherence-data-grid-datasheetpdf; copyright 2007.
Wikipedia, the free encyclopedia, Object-relational mapping, http://en.wikipedia.org/wiki/Object-relational_mapping, May 2009.
Scott W. Ambler, Agile Data, Mapping Objects to Relational Databases: O/R Mapping in Detail, http://www.agiledata.org/essays/mappingObjects.html ; 2009.

* cited by examiner

*Primary Examiner* — Cam-Linh Nguyen
(74) *Attorney, Agent, or Firm* — Squire, Sanders & Dempsey (US) LLP (57) ABSTRACT

A computer-readable medium, computer-implemented method, and system for manipulating an object is provided. In one embodiment, an object which include one or more object references is converted into an intermediate object for serialization. In another embodiment, an object is restored from an intermediate object that has been deserialized so that the object includes one or more object references.

24 Claims, 5 Drawing Sheets

Fig. 5

COMPUTER OBJECT CONVERSION USING AN INTERMEDIATE OBJECT

FIELD

One embodiment is directed generally to a computer system, and in particular to a computer system that provides for the manipulation of objects.

BACKGROUND

Several application development projects use object technology to build application software. An object is a programming data structure which includes data values and procedures that can manipulate the data values. For example, in the Java® programming language, a class is a template describing the data values and procedures that are grouped together to represent something, and an object is a variable constructed according to the template of the class. In other words, an object is an instance of a class, or template. Once an object is created from the class, or template, the object resides in the memory of the application while the object is in use by the application. The object is then removed from memory once the object is no longer in use by the application.

An object can be made to outlive the lifetime of the application which created the object through the process of serialization and deserialization. Serialization is the process of saving the current state of an object to a sequence of bytes, such as a stream. Deserialization is the process of later constructing an equivalent object from the sequence of bytes. The sequence of bytes serves as a container for the object, where the sequence of bytes includes a partial representation of the object's data values and procedures. The container may be transient in order to allow the object to be transported from one application to another, possibly over a network. As an alternative, the container may be persistent so that the object may be stored on a storage medium, so that the object is accessible even after the application which created the object is terminated. In both cases, the information stored in the container can later be used to construct an equivalent object containing the same data values and procedures as the original object.

In the scenario where an object includes a reference to another object, this referenced object (and the referenced object's associated data) is also serialized and stored as part of the container. This is done in order to avoid the reconstructed object containing null object references when it is reconstructed from the container. Furthermore, in the scenario when the object includes a reference to another object, when the object is deserialized, the object references are also reconstructed from the stream that the object was deserialized from. This is done because only the stream contains the current state of the referenced objects.

SUMMARY

One embodiment of the invention is directed to a computer-readable medium having instructions stored thereon that, when executed by a processor, cause the processor to convert a root object including one or more object references into an intermediate object. The instructions can include creating the intermediate object, and storing the root object within the intermediate object. The instructions can also include determining one or more primary keys for the one or more object references, and storing the one or more primary keys within the intermediate object, and removing the one or more object references from the root object.

Another embodiment of the invention is directed to a computer-readable medium having instructions stored thereon that, when executed by a processor, cause the processor to restore a root object from an intermediate object including the root object and one or more primary keys. The instructions can include retrieving one or more objects from a resource based on the one or more primary keys, and creating one or more object references to the one or more retrieved objects within the root object. The instructions can further include removing the root object from the intermediate object, and disposing of the intermediate object.

BRIEF DESCRIPTION OF THE DRAWINGS

Further embodiments, details, advantages, and modifications will become apparent from the following detailed description of the preferred embodiments, which is to be taken in conjunction with the accompanying drawings, wherein.

DETAILED DESCRIPTION

One embodiment of the invention is directed toward converting a root object which includes one or more object references into an intermediate object. In converting the root object into an intermediate object, the one or more object references are removed from the root object. For each object reference that is removed, a primary key is generated. The root object and the one or more primary keys are stored in the intermediate object. The intermediate object, which includes the root object and the one or more primary keys, may be subsequently serialized in order to transport the object to a remote location, or in order to persist the object in a storage medium.

Another embodiment of the invention is directed towards restoring a root object from an intermediate object which includes one or more primary keys, so that the root object includes one or more object references. The intermediate object is an object that is created through deserialization. In restoring the root object from the intermediate object, for each primary key stored within the intermediate object, a corresponding object is retrieved from an resource. For each corresponding object that is retrieved from the resource, an object reference of the root object is restored by assigning the object reference to the corresponding retrieved object. The root object and its object references is then removed from the intermediate object, and the intermediate object is disposed of. The root object, and its object references, is a copy of the original root object which is converted to an intermediate object in preparation for serialization. The root object can then be used locally by an application.

Figure 1:
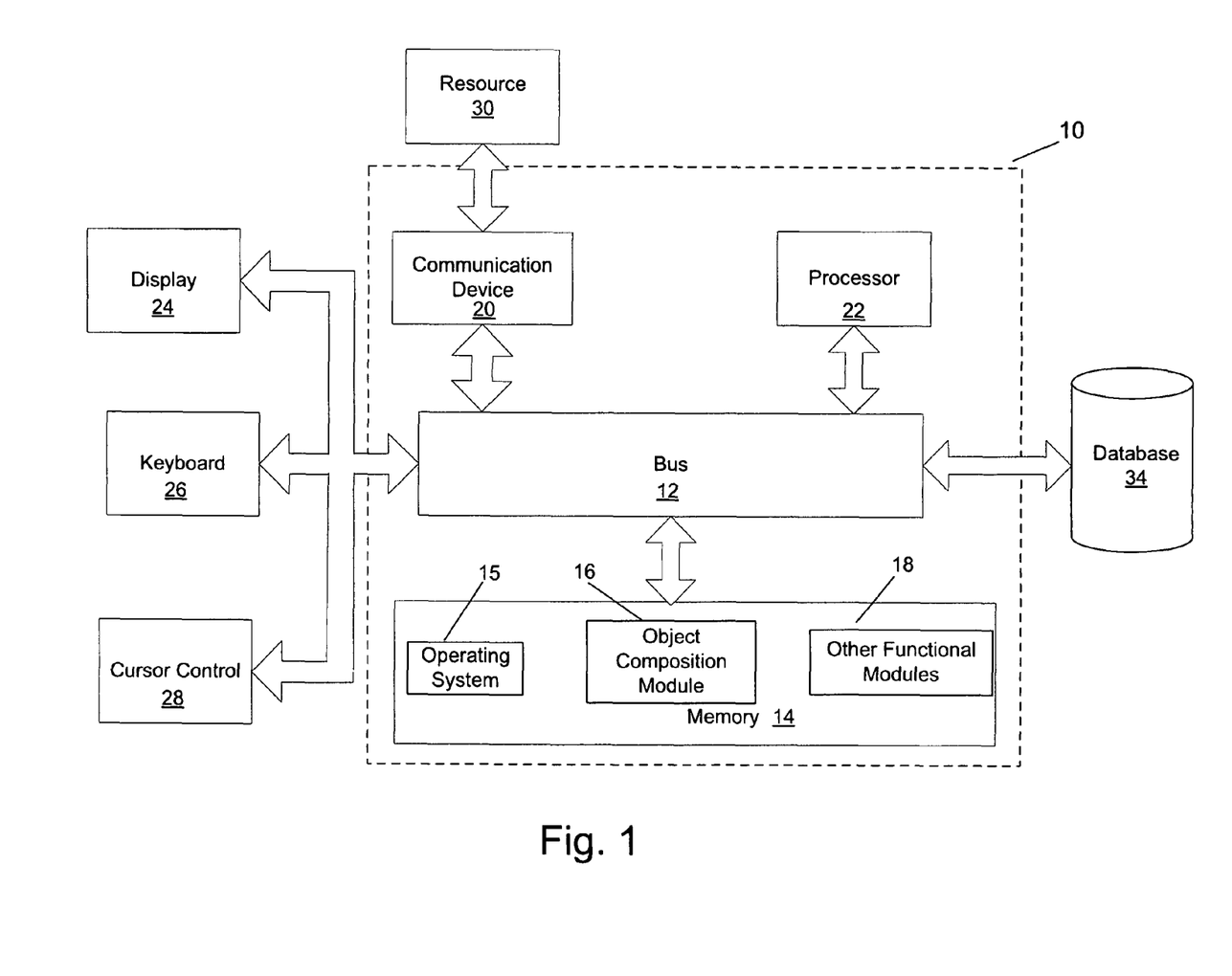
FIG. 1 illustrates a block diagram of a computer system that may implement an embodiment of the present invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method. Also as a result, system 10 can communicate remotely with a resource 30 via communication device 20. As an example, a resource may comprise a "Coherence" product from Oracle Corporation. System 10 also includes a database 34. As an example, a database may comprise a relational database or an object-oriented database.

A computer-readable medium may be any available medium that can be accessed by processor 22. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system.

According to one embodiment, memory 14 can store software modules that may provide functionality when executed by processor 22. The modules can include an operating system 15, object composition module 16, as well as other functional modules 18. Operating system 15 can provide an operating system functionality for system 10. Object composition module 16 provides for the manipulation of objects in system 10, as will be described in more detail below. System 10 can also be part of a larger system. Thus, system 10 can include one or more additional functional modules 18 to include the additional functionality. For example, functional modules 18 may include modules that are part of the "TopLink" and "TopLinkGrid" products from Oracle Corporation.

In an embodiment of the invention, system 10 provides for the development of computer applications using an object-oriented programming language, such as Java®, C++, C#, Visual Basic, Python, Ruby, Perl 5, PHP, and ColdFusion. A computer application developed by system 10 can perform various data management tasks by manipulating objects which may include scalar and non-scalar values, such as other objects. For example, the computer application may create an "Employee" object which represents the data associated with an employee of a company, such as the employee's name, a list of phone numbers, and a list of addresses. While the employee's name may be represented as scalar data, the list of phone numbers and a list of address may be represented by objects themselves. For example, the list of phone numbers can be presented by a set of "PhoneNumber" objects, and the list of addresses can be represented by a set of "Address" objects. The Employee object is treated as a single value, where the object includes the name data, and references to one or more PhoneNumber objects and Address objects which include the phone number and address data. Thus, the Employee object represents the entire body of data associated with the company employee.

Furthermore, according to the embodiment, a computer application developed by system 10 can persist data, which is represented as objects in the computer application, in a storage medium, such as database 34, or transport data to a resource, such as resource 30. Resource 30 may be another computer application, which may be developed by system 10 or may be developed by another system not shown in FIG. 1. Alternatively, resource 30 may be a cache. A cache is a collection of data duplicating values originally stored elsewhere, where the original data is expensive to fetch. In an embodiment of the invention, resource 30 may comprise a "Coherence" cache product from Oracle Corporation. As another alternative, resource 30 may be a database which is a database separate from database 34. The separate database may be a relational database or an object-oriented database.

In an embodiment of the invention, object composition module 16 provides for the manipulation of objects in system 10. Objects may be classified as root objects and intermediate objects. A root object is a standard object which represents a series of data values and procedures, and which may include one or more references to other objects. An intermediate object is a special type of object which is utilized in the serialization and deserialization process, and may include a root object and one or more primary keys.

In certain circumstances, it is undesirable to use object references to represent references to other objects. Furthermore, while these object references may be able to be decomposed during serialization and recomposed during deserialization, there is currently no mechanism for utilizing a separate stream and retrieval mechanism to retrieve the object references for recomposition.

According to an embodiment of the invention, a root object may be manipulated by object composition module 16 by removing all of the root object's references, converting the object references into primary keys and placing the original object (without references) and the primary keys into an intermediate object. The system 10 can subsequently serialize the intermediate object rather than the root object.

When an application of system 10 requires the root object, the corresponding intermediate object is deserialized. Once the intermediate object has been deserialized, object composition module 16 recreates the object references of the root object stored within the intermediate object by retrieving objects from a resource based on the primary keys stored within the intermediate object. Object composition module 16 then removes the root object (with object references) from the intermediate object, disposes of the intermediate object, and returns the root object (with object references) to the application of system 10 which requested the root object. The root object is a copy of the original root object before the serialization/deserialization process and may be utilized by the application.

Figure 2:
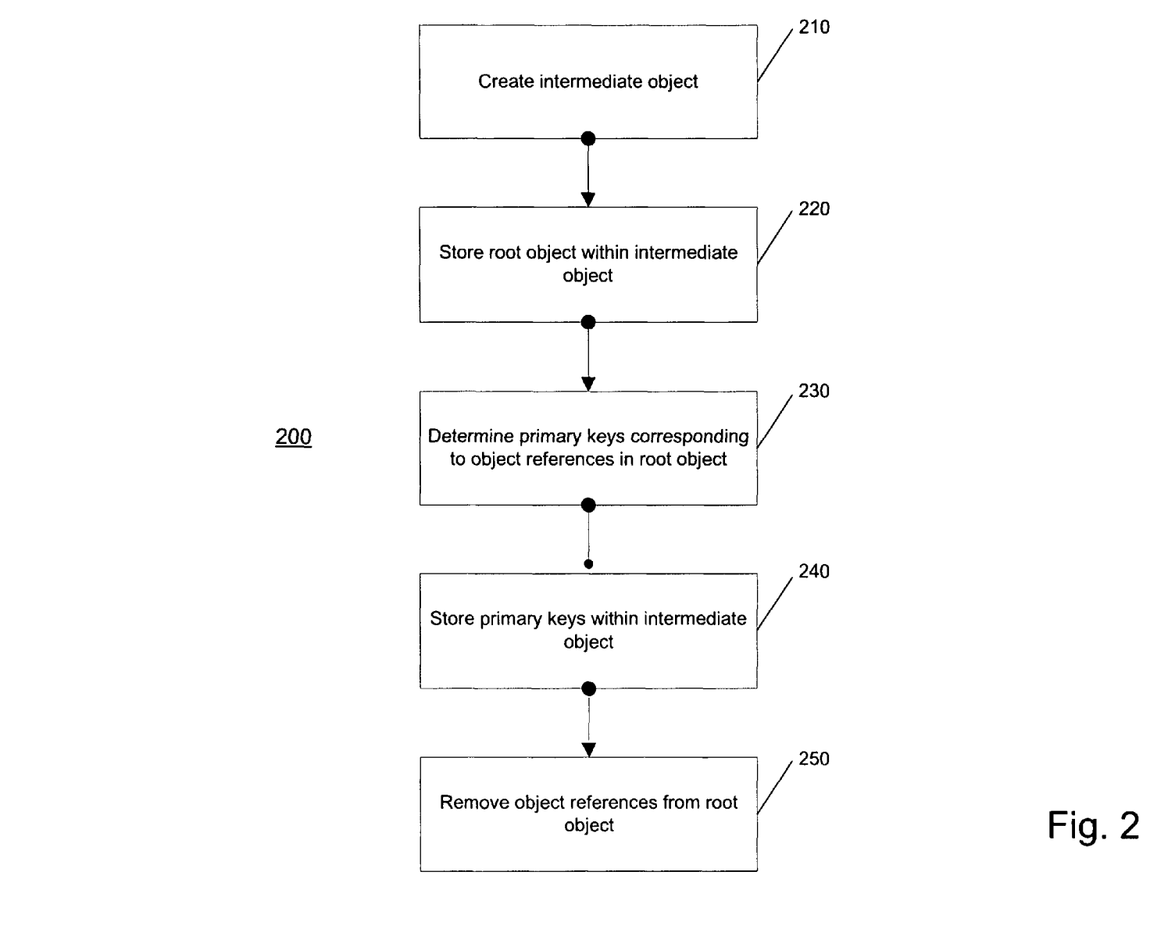
FIG. 2 illustrates a flow diagram for a process of converting a root object comprising one or more object references into an intermediate object in accordance with one embodiment of the invention.

FIG. 2 illustrates a flow diagram 200 of the functionality of object composition module 16 of system 10 in converting a root object comprising one or more object references into an intermediate object, according to one embodiment of the invention. In one embodiment, the functionality of flow diagram 200 of FIG. 2, and flow diagram 300 of FIG. 3 described below, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

As described above, in accordance with an embodiment of the invention, a root object, which includes one or more object references, can be serialized without requiring the serialization of the referenced objects through the mechanism of an intermediate object. At 210, the intermediate object is created. The intermediate object is configured to store the root object, and is configured to reproduce the procedures of the root object which provides for access to the data values of the root object. The intermediate object can be dynamically generated. At 220, the root object, and its object references, are stored within the intermediate object. Thus, the root object, and its object references, can now be accessed via the intermediate object.

At 230, for each object reference of the root object, a corresponding primary key is extracted. The primary key is a unique key which corresponds to a primary key of a resource where the referenced object has been persisted and can be retrieved. For example, the resource may be a database, such as a relational database or object-oriented database, may be a cache, or may be a computer application. This means that the primary key can be utilized subsequently to restore a referenced object because the primary key maps to the entry in the resource where the corresponding object is persisted. Thus, the primary key serves as an identifier of the referenced object.

At 240 for each object reference of the root object, the corresponding primary key is stored within the intermediate object. For example, the intermediate object may contain an array which stores the list of primary keys, and each primary value is inserted into the array of the intermediate object. At 250, each object reference is removed from the root object so that the root object does not include any object references. For example, each object reference may be reset to the value "NULL" so that the root object does not include a reference to the referenced object. In this manner, each object reference of the root object may be "broken" so that the root object no longer includes any references to other objects. Instead, the intermediate object includes one or more identifiers (i.e., primary keys) where each identifier represents each object reference.

In the embodiment, the intermediate object is then capable of being serialized by system 10. Because the intermediate object only includes the root object and a set of primary keys which identify the referenced objects, system 10 is not required to serialize each referenced object that was originally referenced by the root object. Instead, system 10 is only required to serialize the intermediate object. The "breaking up" of the object references, so that only the root object is serialized, allows system 10 to balance its memory requirements in a more efficient fashion due to the fact that system 10 does not need to serialize every object referenced by the root object. Furthermore, this feature allows system 10 to store objects referred to by the root object in different resources, and thus improve resource consumption by leading to a more efficient utilization of resources.

Figure 3:
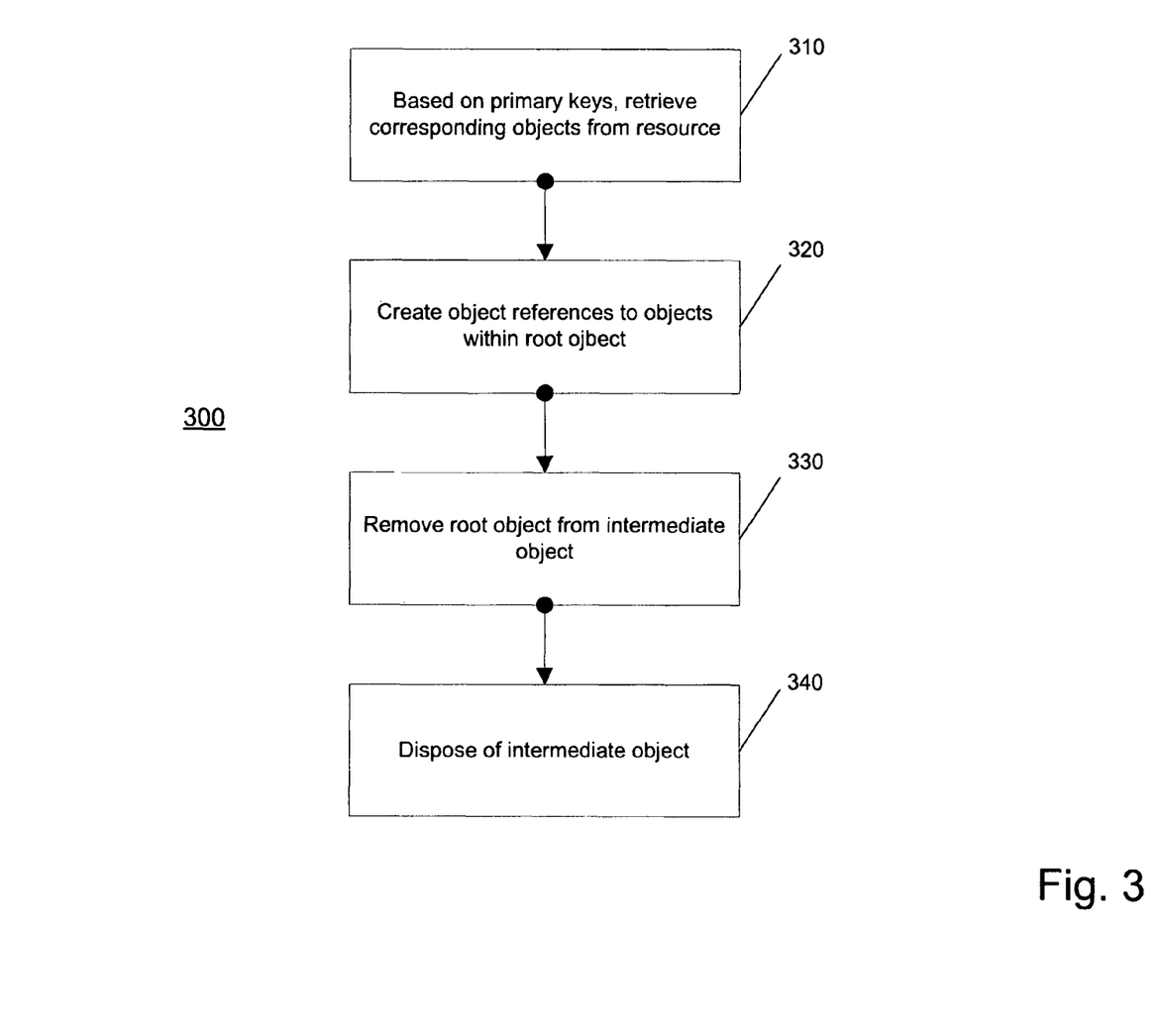
FIG. 3 illustrates a flow diagram for a process of restoring a root object from an intermediate object comprising the root object and one or more primary keys in accordance with one embodiment of the invention.

FIG. 3 illustrates a flow diagram 300 of the functionality of object composition module 16 of system 10 in restoring a root object from an intermediate object comprising the root object and one or more primary keys, according to one embodiment of the invention.

As described above, system 10 is also capable of deserializing a root object which was previously converted to an intermediate object and serialized in order to restore the root object in the scenario where the root object is requested by an application. Because the intermediate object is the object that was serialized, the deserialization process produces the intermediate object. System 10 can then restore the root object from the intermediate object that is retrieved from the deserialization process.

At 310, an object is retrieved from a resource for each primary key of the one or more primary keys of the intermediate object. More specifically, the resource is queried using each primary key, in order for the resource to return the correct object. As described above, each primary key corresponds to an object that was referenced by the original root object. As also described above, the primary key maps to the entry in the resource where the corresponding object is persisted.

Because the intermediate object only includes a primary key which corresponds to the object which was originally referenced by the root object, and does not include any other information regarding the referenced object, system 10 is not limited to seeking the referenced object from the source of the serialized intermediate object. Instead, system 10 may query any resource which contain the referenced object and indexes the stored objects using the same key as the primary key. For example, according to an embodiment of the invention, system 10 may query database 34 for the referenced object. According to another embodiment of the invention, system 10 may query resource 30 for the referenced object. In certain embodiments, resource 30 may be a cache. Furthermore, in an embodiment of the invention, system 10 may query a separate resource for each referenced object. For example, system 10 may query resource 30 for a first referenced object, query database 34 for a second referenced object, and query a separate resource or database for a third referenced object. This provides the ability to store data in multiple resources, and thus, lower the resource requirements of each resource.

At 320, an object reference is created within the root object for each retrieved object. Thus, the root object includes each and every object reference that it included before the root object was converted into an intermediate object according to the flow diagram 200 illustrated in FIG. 2. At 330, the root object, including its object references, is removed from the intermediate object. At 340, the intermediate object is disposed with, so that the only object remaining is the root object. The root object that is produced from the restoration process is a copy of the root object that was originally serialized, and includes all the associated data of the original root object, including object references of the original root object. The root object can now be returned by system 10 for conventional manipulation of the object.

Figure 4:
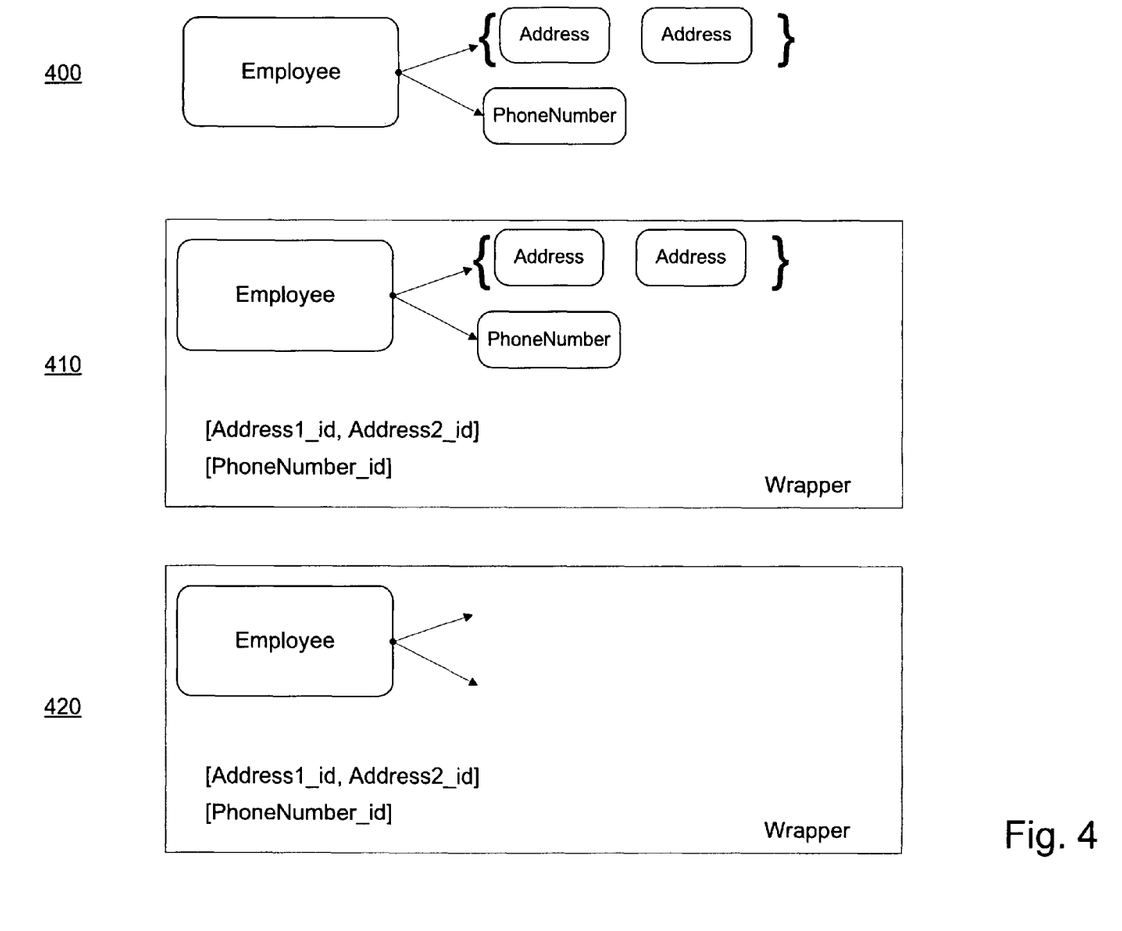
FIG. 4 illustrates an object diagram of a root object comprising one or more object references which is converted into an intermediate object in accordance with one embodiment of the invention.

FIG. 4 illustrates an object diagram of an embodiment of the invention utilizing the functionality of object composition module 16 of system 10 in order to convert a root object comprising one or more object references into an intermediate object. In the embodiment, the root object comprising one or more object references, and the intermediate object, are each an instance of a class of the Java® programming language. However, one of ordinary skill in the art would readily understand that in alternative embodiments the root object and the intermediate object may each be an object of a programming language other than Java®, such as C++, C#, Visual Basic, Python, Ruby, Perl 5, PHP, and ColdFusion.

Object diagram 400 illustrates an example of a root object according to an embodiment of the invention. As described above, in the Java® programming language, an object is an instance of a class. In this illustrated example, the root object is an instance of a Java class named "Employee". The Employee object includes various data values and procedures, including a set of references to instances of a Java class named "Address" (which represents an employee's address information) and a set of reference to instances of a Java class named PhoneNumber (which represents an employee's phone number information). In object diagram 400, the Employee object includes object references to two Address objects and one object reference to a "PhoneNumber" object. However, one of ordinary skill in the art would readily understand that this is merely an example, and that the root object can include one or more object references of each object type.

Object diagram 410 illustrates an example of an intermediate object which is created to contain the root object of object diagram 400, where the object references of the root object have not yet been removed. In this illustrated example, the intermediate object is an instance of a Java class named "Wrapper". The Wrapper object is configured to store the Employee object. The Wrapper object is also configured to store a primary key which corresponds to each object reference of the Employee object. In the illustrated example, the Wrapper object stores the primary keys Address1_id and Address2_id which identify the object references of the two Address objects, and stores the primary key PhoneNumber_id which identifies the object reference of the PhoneNumber object. As described above, each primary key is a key which can be used to query a database or resource in order to retrieve the object that is referred to by the object reference of the root object. In the illustrated example, Address1_id could be used to query a database or resource in order to retrieve the first Address object referenced by the Employee object. Likewise, Address2_id and PhoneNumber_id could be used to retrieve the second Address object and the PhoneNumber referenced by the Employee object, respectively.

Object diagram 420 illustrates an example of an intermediate object, where the object references of the root object have been removed. As shown in object diagram 420, the object references of the Employee object no longer refer to either the two Address objects or the PhoneNumber object. Instead, the object references are reset so they do not refer to any data. In an embodiment of the invention, the object references are reset by setting the object references to NULL. Once the object references are reset, only the primary keys stored in the Wrapper object refer to the two Address objects or the PhoneNumber object. The Wrapper object is then ready for serialization in order to either persist the Wrapper object to a database, or transport the Wrapper object to a resource.

Figure 5:
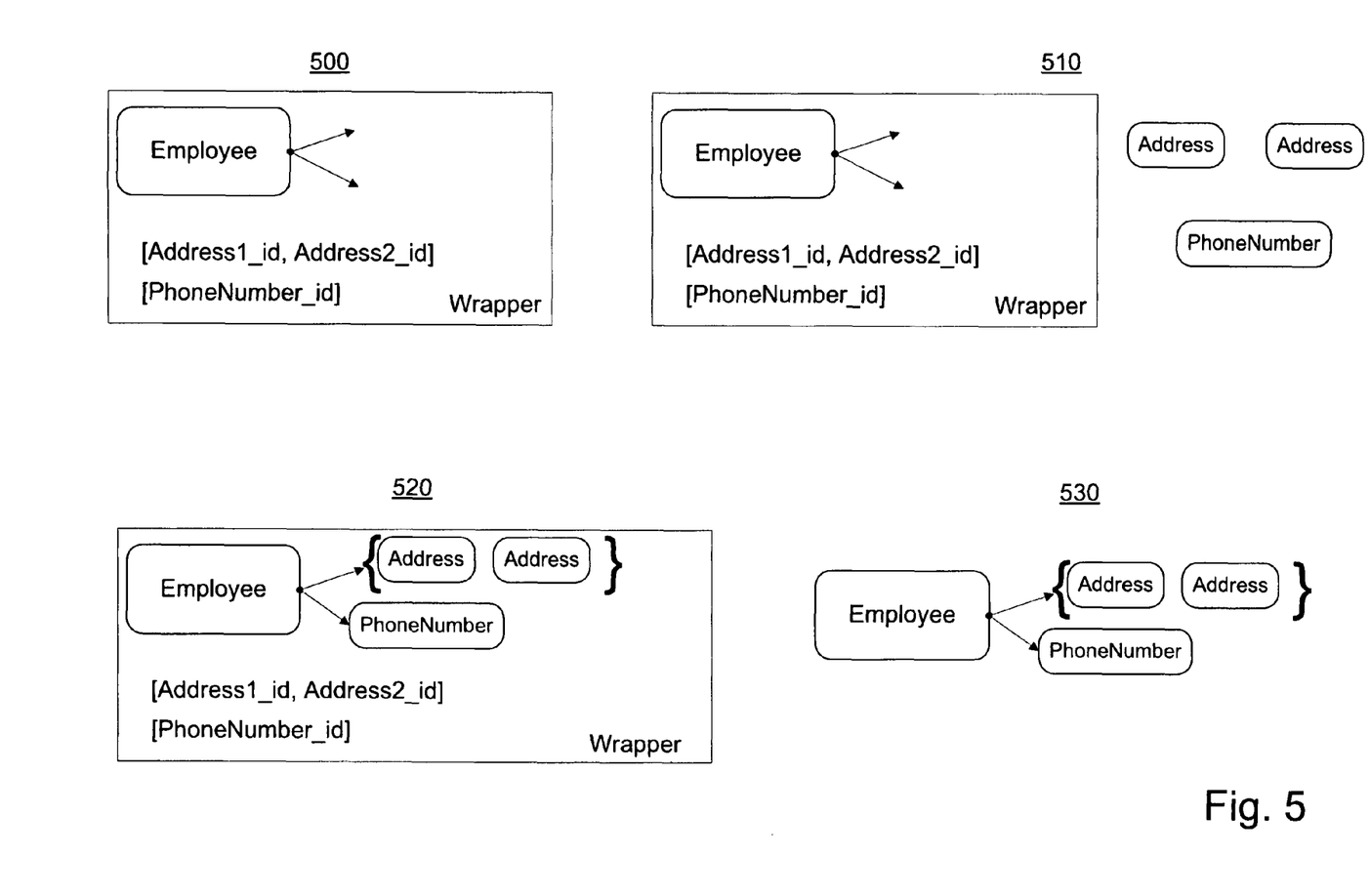
FIG. 5 illustrates an object diagram of a root object which is restored from an intermediate object comprising the root object and one or more primary keys in accordance with one embodiment of the invention.

FIG. 5 illustrates an object diagram of an embodiment of the invention utilizing the functionality of object composition module 16 of system 10 in order to restore a root object from an intermediate object comprising the root object and one or more primary keys. In the embodiment, the root object, and the intermediate object comprising the root object and one or more primary keys, are each an instance of a class of the Java® programming language. However, one of ordinary skill in the art would readily understand that in alternative embodiments the root object and the intermediate object may each be an object of a programming language other than Java®, such as C++, C#, Visual Basic, Python, Ruby, Perl 5, PHP, and ColdFusion.

Object diagram 500 illustrates an example of an intermediate object returned from a deserialization process, where the original root object was converted into the intermediate object before serialization. In this illustrated example, the intermediate object is an instance of a Java class named Wrapper. As shown in object diagram 500, the Wrapper object includes the root object (i.e., the Employee object, which is an instance of a Java class named Employee), and the primary keys (i.e., Address1_id, Address2_id, and PhoneNumber_id).

Object diagram 510 illustrates an example of the intermediate object when a object which corresponds to each primary key has been retrieved from a resource (not shown). In the example illustrated in object diagram 510, a resource (not shown) is queried using the primary keys Address1_id, Address2_id, and PhoneNumber_id. The resource returns the first Address object (as shown in object diagram 400) based on the primary key Address1_id, returns the second Address Object (as shown in object diagram 400) based on the primary key Address2_id, and returns the PhoneNumber object based on the primary key PhoneNumber_id. The two Address objects, and the PhoneNumber object are each a copy of the corresponding referenced object of the root object shown in object diagram 400. As described above, in an embodiment of the invention, the resource which retrieves the referenced objects may be a different resource than the resource that retrieved the intermediate object. In another embodiment, the two Address objects and the PhoneNumber object may each be retrieved from a separate resource. As also described above, the resource may be any type of resource, such as cache, and the database may be any type of database, such as a relational database or object-oriented database.

Object diagram 520 illustrates an example of the intermediate object, where the object references of the root object within the intermediate object have been restored. In this example, the Employee object within the Wrapper object includes object references to the two Address objects and the PhoneNumber object. Thus, the Employee object contains all of its object references it contained before it was stored within the Wrapper. The object references of the Employee object are restored by assigning each object reference to one of the retrieved objects. In this example, the first object reference of the Employee object is assigned to the first Address object, the second object reference of the Employee object is assigned to the second Address object, and the third object reference of the Employee object is assigned to the PhoneNumber object.

Object diagram 530 illustrates an example of the root object, where the root object has been removed from the intermediate object, and the intermediate object has been disposed of. In the illustrated example, Employee object, including its object references, has been removed from the Wrapper object, and the instance of the Wrapper object has been disposed of, so only the Employee object exists. The resulting Employee object of object diagram 530 is a copy of the original Employee object of object diagram 400, and like the original Employee object of object diagram 400, the Employee object of object diagram 530 includes two object references to the two Address objects, and one object reference to the PhoneNumber object. The Employee object in object diagram 530 is then capable of being returned to an application which originally requested it.

As described above, an embodiment of the invention provides for converting an object which include one or more object references into an intermediate object for serialization, where the intermediate object includes one or more primary keys to represent the one or more object references. Furthermore, another embodiment of the invention provides for restoring an object from an intermediate object that has been deserialized by replacing the primary keys of the intermediate object with the objects that were originally referenced so that the object includes one or more object references. Thus, an object which includes object references can be serialized without also serializing the objects referenced by the object references. Furthermore, once an object has been deserialized, the object's references can be retrieved from a resource which is separate from the serialized object.

For example, in an embodiment of the invention, an Oracle TopLink Grid product can convert and restore instances of classes which include interclass references, where the class instances are transformed into and retrieved from an Oracle Coherence Cache product. This functionality allows for automatic restoration of the interclass references. Without this functionality, the restoration of the interclass references would not be as efficient.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A computer-readable storage medium having instructions stored thereon that, when executed by a processor, cause the processor to convert a root object comprising one or more object references into an intermediate object, the instructions comprising:
creating the intermediate object;
storing the root object within the intermediate object;
determining one or more primary keys for the one or more object references;
storing the one or more primary keys within the intermediate object;
removing the one or more object references from the root object;
storing the intermediate object in a first resource; and
storing a subsequent intermediate object in a second resource, wherein the intermediate object and the subsequent intermediate object are stored in separate resources.

2. The computer-readable medium of claim 1, the instructions further comprising:
serializing the intermediate object.

3. The computer-readable medium of claim 1, wherein the first resource is at least one of a database, a cache, and a computer application.

4. The computer-readable medium of claim 3, wherein the database is at least one of a relational database and a object-oriented database.

5. The computer-readable medium of claim 3, wherein the cache is an Oracle Coherence cache.

6. The computer-readable medium of claim 1, wherein the intermediate object is a wrapper.

7. The computer-readable medium of claim 1, wherein the creating the intermediate object further comprises dynamically generating the intermediate object.

8. The computer-readable medium of claim 1, wherein the removing the one or more object references from the root object further comprises setting the one or more object references to a null value.

9. The computer-readable medium of claim 1, wherein the root object and the intermediate object are each an object of an object-oriented programming language.

10. The computer-readable medium of claim 9, wherein the root object and the intermediate object are each an object of Java® programming language.

11. The computer-readable medium of claim 1, wherein the instructions are a component of an Oracle TopLink application.

12. A computer-readable storage medium having instructions stored thereon that, when executed by a processor, cause the processor to restore a root object from an intermediate object comprising the root object and one or more primary keys, the instructions comprising:
retrieving one or more objects from a resource based on the one or more primary keys;
creating one or more object references to the one or more retrieved objects within the root object;
removing the root object from the intermediate object;
disposing of the intermediate object;
wherein the retrieving one or more objects further comprises retrieving the one or more objects from separate resources.

13. The computer-readable medium of claim 12, the instructions further comprising:
deserializing the intermediate object.

14. The computer-readable medium of claim 12, wherein the resource is at least one of a database, a cache, and a computer application.

15. The computer-readable medium of claim 14, wherein the database is at least one of a relational database and a object-oriented database.

16. The computer-readable medium of claim 14, wherein the cache is an Oracle Coherence cache.

17. The computer-readable medium of claim 12, wherein the intermediate object is a wrapper.

18. The computer-readable medium of claim 12, wherein the root object and the intermediate object are each an object of an object-oriented programming language.

19. The computer-readable medium of claim 18, wherein the root object and the intermediate object are each an object of Java® programming language.

20. The computer-readable medium of claim 12, wherein the instructions are a component of an Oracle TopLink application.

21. A computer-implemented method for converting a root object comprising one or more object references into an intermediate object, the method comprising:
- creating the intermediate object;
- storing the root object within the intermediate object;
- determining one or more primary keys for the one or more object references;
- storing the one or more primary keys within the intermediate object;
- removing the one or more object references from the root object;
- storing the intermediate object in a first resource;
- storing a subsequent intermediate object in a second resource, wherein the intermediate object and the subsequent intermediate object are stored in separate resources; and
- wherein the method is performed by a computer processor.

22. A computer-implemented method for restoring a root object from an intermediate object comprising the root object and one or more primary keys, the method comprising:
- retrieving one or more objects from a resource based on the one or more primary keys;
- creating one or more object references to the one or more retrieved objects within the root object;
- removing the root object from the intermediate object;
- disposing of the intermediate object;
- wherein the retrieving one or more objects further comprises retrieving the one or more objects from separate resources; and
- wherein the method is performed by a computer processor.

23. A system for converting and restoring objects, the system comprising:
- a processor configured to
  - create an first intermediate object;
  - store a first root object comprising one or more first object references within the first intermediate object;
  - determine one or more first primary keys for the one or more first object references;
  - store the one or more first primary keys within the first object;
  - remove the one or more first object references from the first root object;
  - receive a second intermediate object comprising a second root object and one or more second primary keys;
  - retrieve one or more objects from a resource based on the one or more second primary keys;
  - create one or more second object references to the one or more retrieved objects within the second root object;
  - remove the second root object from the second intermediate object;
  - dispose of the second intermediate object;
  - store the first intermediate object in a first resource; and
  - store a subsequent intermediate object in a second resource, wherein the first intermediate object and the subsequent intermediate object are stored in separate resources.

24. The system of claim 23, wherein the processor is further configured to retrieve the one or more objects from separate resources.

* * * * *

UNITED STATES PATENT AND TRADEMARK OFFICE
CERTIFICATE OF CORRECTION

| | | |
|---|---|---|
| PATENT NO. | : 8,024,374 B2 | Page 1 of 1 |
| APPLICATION NO. | : 12/508876 | |
| DATED | : September 20, 2011 | |
| INVENTOR(S) | : Yorke | |

It is certified that error appears in the above-identified patent and that said Letters Patent is hereby corrected as shown below:

In column 12, line 10, in Claim 23, before "object;" insert -- intermediate --.

Signed and Sealed this
Sixth Day of December, 2011

David J. Kappos
*Director of the United States Patent and Trademark Office*